Figure 1:
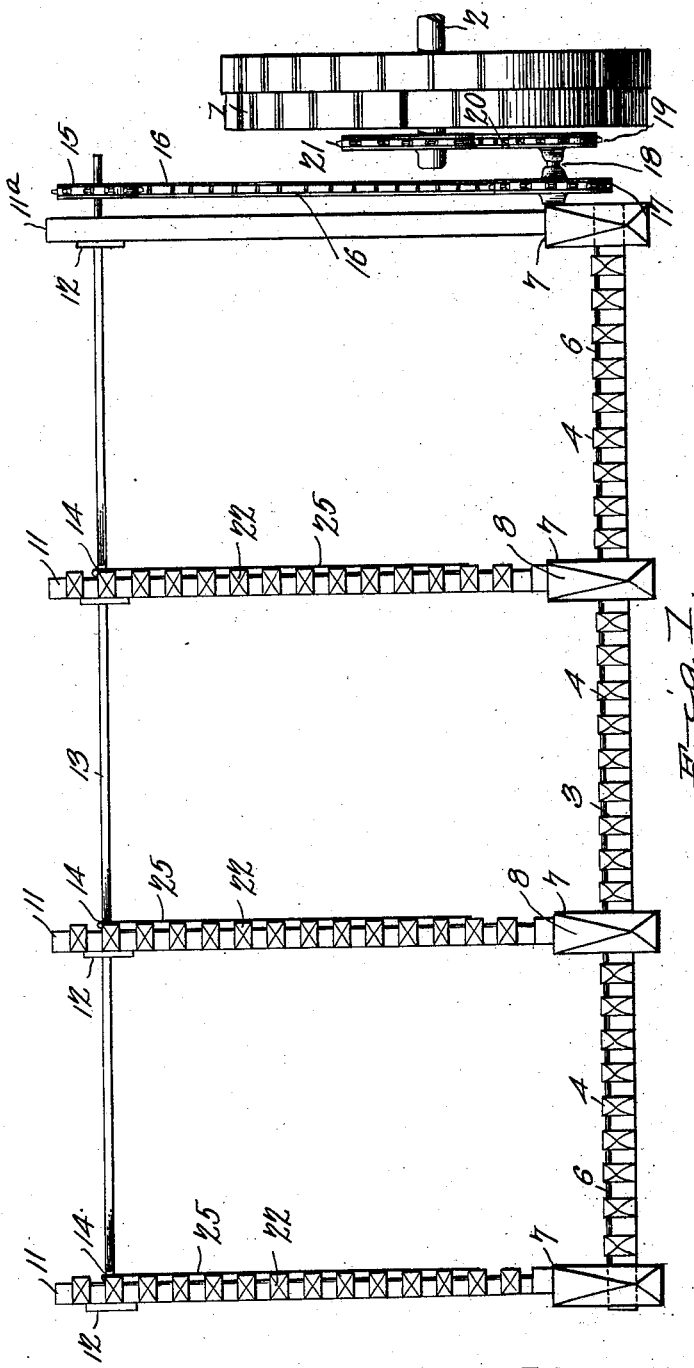

No. 747,946. PATENTED DEC. 29, 1903.
J. H. J. COUNTS.
MOWING MACHINE.
APPLICATION FILED MAR. 19, 1903.
NO MODEL. 2 SHEETS—SHEET 1.

Witnesses
J. H. J. Counts, Inventor.
by C. A. Snow & Co.
Attorneys

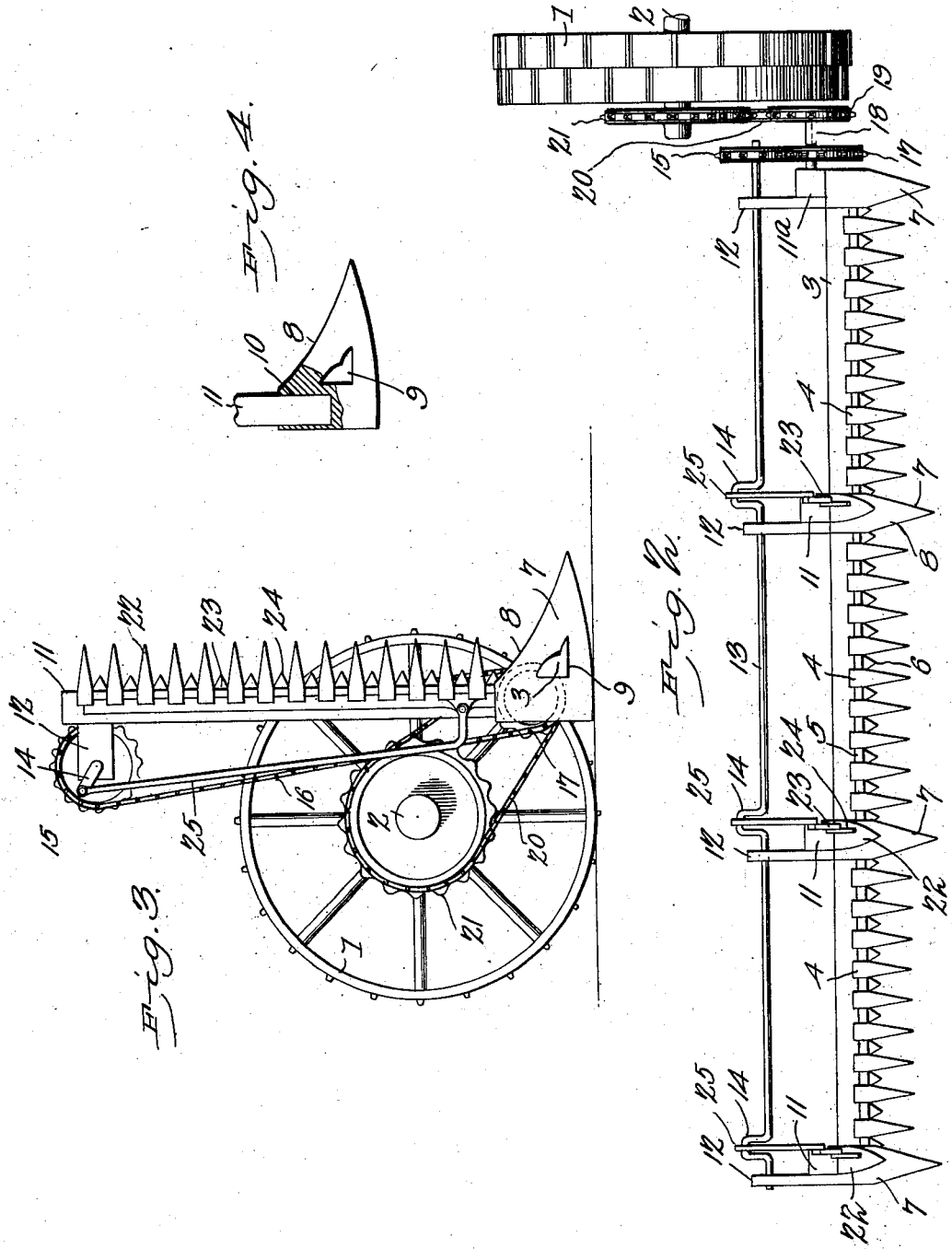

No. 747,946.

Patented December 29, 1903.

UNITED STATES PATENT OFFICE.

JOHN H. J. COUNTS, OF OCALA, FLORIDA.

MOWING-MACHINE.

SPECIFICATION forming part of Letters Patent No. 747,946, dated December 29, 1903.

Application filed March 19, 1903. Serial No. 148,595. (No model.)

*To all whom it may concern:*

Be it known that I, JOHN H. J. COUNTS, a citizen of the United States, residing at Ocala, in the county of Marion and State of Florida, have invented a new and useful Mowing-Machine, of which the following is a specification.

This invention relates to mowing-machines; and it has for its object to construct a machine of this class which shall be especially adapted for harvesting crops—such as peas, beans, and the like—the growth of which is so tangled and matted as to render them incapable of being operated upon by mowing-machines of ordinary construction, for the reason that while an ordinary mowing-machine will sever the stems or stalks it will be found incapable of separating the tangled mass of vines without exerting upon the machine a degree of side draft which not only interferes with the progress of the machine but is apt to cause a strain which is positively injurious to the machine as well as to the crop that is being gathered. Mowing-machines of this class have heretofore been constructed with cutting apparatus disposed vertically at right angles to the usual horizontal cutting apparatus at the outer end of the same for the purpose of cutting or severing the tangled crop vertically.

My present invention relates to certain improvements in such vertical cutting apparatus, in the construction and general disposition of the same, and in the detailed construction, arrangement, and combination of parts to be hereinafter fully described whereby a machine of this class shall be produced possessing superior advantages in point of simplicity, durability, and general efficiency.

In the accompanying drawings, Figure 1 is a front elevation of as much of a mowing-machine as is necessary to illustrate my invention. Fig. 2 is a top plan view of the same. Fig. 3 is an end elevation. Fig. 4 is a detail view, partly in section, of one of the shoes supporting the standards carrying the vertical cutting apparatus.

Corresponding parts in the several figures are indicated by similar numerals of reference.

1 designates the supporting and driving wheel. 2 is the axle of the same.

3 is the horizontally-disposed finger-bar, which is provided with fingers or guards 4 of ordinary construction. The finger-bar supports a cutter-bar 5, having the knives or cutters 6, which coöperate in the usual manner with the guards or fingers. The finger-bar 3 is to be connected in any suitable well-known manner with the frame of the machine; but such connection has not been shown, as it is well known and of ordinary construction, as is the means for transmitting motion to the cutter-bar or sickle-bar 5, which mechanism is also not shown in the drawings. The finger-bar is supported at a proper distance above the ground by means of a plurality of shoes 7, of which in the accompanying drawings four have been shown, two of said shoes being disposed at the inner and outer ends of the finger-bar. The under sides of these shoes are curved upwardly and forwardly in the usual manner, so as to form ground-engaging runners, and their upper sides are sloped upwardly and rearwardly, said upper sides being flattened, as shown at 8, so that the said shoes will serve to elevate the tangled mass of vines that is to be operated upon. The shoes 7 are provided with transverse openings 9 for the passage of the finger-bar and cutter-bar, and said shoes are provided in their upper sides with sockets or recesses 10, in which are supported the lower ends of uprights 11. Said uprights are provided near their upper ends with rearward-extending brackets 12, forming bearings for the shaft 13, having a plurality of cranks 14, one of said cranks being located in alinement with each of the uprights 11, except the one at the inner end of the finger-bar, which for the sake of distinguishing it from the remaining uprights is designated 11ª. Adjacent to said upright 11ª on crank-shaft 13 is provided a sprocket-wheel 15, connected by a chain 16 with a sprocket-wheel 17, which is shown as being mounted upon a shaft 18, extending laterally from the upright 11ª. The shaft 18 also carries a smaller sprocket-wheel 19, connected by a chain 20 with a sprocket-wheel 21 upon the driving-wheel 2.

Each of the uprights 11 is provided with a plurality of guard-fingers 22 and with a vertically-slidable cutter-bar 23, having knives or cutters 24. The construction of the guard-fingers, the cutter-bar, and the cutters may in every respect resemble that of the horizontal cutting apparatus. The cranks 14 of the shaft 13 are connected by means of pitmen 25 with the cutter-bars 23, to which when the machine is in operation a vertically-reciprocating motion will thus be communicated.

The operation and advantages of this device will be readily understood from the foregoing description, taken in connection with the drawings hereto annexed. It will be understood that when the machine of which my invention forms a part progresses over the field the horizontally-disposed cutting apparatus will operate to sever the stems or stalks of the vines with which it comes in contact. The mass or mat thus severed will be elevated upon the upwardly-inclined planes 8 of the shoes 7 to the vertically-disposed cutting device, by means of which the said mat or mass will not only be severed at the outer end of the horizontal cutting apparatus, but also be subdivided into a plurality of pieces or strips, in the example herein illustrated three in number, which may be afterward readily disposed of.

My improved cutting apparatus is possessed of several advantages, which will be readily apparent to those skilled in the art to which my invention appertains. One feature which I consider of importance is the construction of the shoes whereby the crop thus being harvested is elevated prior to being operated upon by the vertically-disposed cutting devices, inasmuch as by this construction less resistance will be offered to the progress of the machine. Again, by pluralizing the cutting devices the crop thus being harvested is subdivided into several strips, thereby greatly facilitating the subsequent gathering of the crop. Furthermore, it will be noticed that the shaft from which the several vertically-disposed cutters is operated is disposed at the upper ends of the supporting-bars, thus preventing the possibility of the operating parts of the device becoming tangled with the matted growth that is being operated upon. Other advantages will readily suggest themselves to those familiar with this class of devices.

I desire it to be understood that my invention may be in the nature of an attachment to a mowing-machine of ordinary construction which at moderate expense may be readily adapted to receive and support my improved cutting apparatus. I also wish it to be understood that while I have in the foregoing described a simple and preferred form of my invention I do not necessarily limit myself to the structural details herein described, but reserve the right to any changes, modifications, and alterations which may be resorted to without departing from the spirit and scope of my invention and without sacrificing the utility of the same.

Having thus described my invention, I claim—

1. In a mowing-machine, a plurality of shoes, a finger-bar supported upon said shoes, said shoes having upwardly and rearwardly inclined upper sides, a cutter-bar coöperating with said finger-bar, and uprights rising from the shoes and carrying vertically-disposed cutting apparatus.

2. In a mowing-machine, a cutting apparatus comprising a finger-bar and a cutter-bar, a plurality of shoes having transverse openings for the passage of said cutting apparatus which is thereby supported upon said shoes, uprights rising from the latter, and vertically-disposed cutting apparatus mounted upon said uprights.

3. In a mowing-machine, a plurality of shoes having transverse openings, cutting apparatus supported in said openings, uprights rising from the shoes, cutting apparatus supported by said uprights, brackets at the upper ends of the latter, a driven shaft journaled in said brackets, cranks upon said shaft, and pitmen connecting said cranks with the vertically-reciprocating cutter-bars of the cutting apparatus supported by said uprights.

4. In a mowing-machine, a plurality of shoes having transverse openings and provided with sockets in their upper sides, cutting apparatus supported in the transverse openings of the shoes, uprights mounted in the sockets of the shoes, cutting apparatus supported upon said uprights, means for transmitting motion to the cutter-bars of said cutting apparatus from a transporting-wheel of the machine.

In testimony that I claim the foregoing as my own I have hereto affixed my signature in the presence of two witnesses.

JOHN H. J. COUNTS.

Witnesses:
R. L. ANDERSON,
S. T. SISTUME.